US006280549B1

(12) United States Patent
Langan

(10) Patent No.: US 6,280,549 B1
(45) Date of Patent: Aug. 28, 2001

(54) DIE-CUT LINERLESS LABEL PRODUCTION

(75) Inventor: Joseph W. Langan, Cheektowaga, NY (US)

(73) Assignee: Moore Business Forms, Inc., Grand Island, NY (US)

( * ) Notice: Subject to any disclaimer, the term of this patent is extended or adjusted under 35 U.S.C. 154(b) by 0 days.

(21) Appl. No.: 08/173,083

(22) Filed: Dec. 27, 1993

(51) Int. Cl.[7] .......... B32B 31/00
(52) U.S. Cl. .......... 156/152; 156/264; 156/289
(58) Field of Search .......... 156/152, 264, 156/289; 428/40, 42, 354, 352

(56) References Cited

U.S. PATENT DOCUMENTS

| | | | | |
|---|---|---|---|---|
| 385,158 | | 6/1888 | Woodhull . | |
| 2,170,147 | * | 8/1939 | Lane | 428/40 |
| 2,555,564 | * | 6/1951 | Berman | 428/40 |
| 3,038,597 | | 6/1962 | Brady, Jr. . | |
| 3,267,623 | | 8/1966 | Block | 206/445 |
| 3,457,137 | | 7/1969 | McCarthy | 156/152 |
| 3,508,754 | | 4/1970 | Shorin | 273/139 |
| 3,914,483 | | 10/1975 | Stipek, Jr. . | |
| 4,210,688 | | 7/1980 | Sato . | |
| 4,454,180 | | 6/1984 | La Mers | 428/42 |
| 4,959,115 | | 9/1990 | Lacy | 428/42 |
| 4,984,683 | | 1/1991 | Eller . | |
| 5,022,526 | | 6/1991 | Crum . | |
| 5,324,078 | * | 6/1994 | Bane | 283/81 |

* cited by examiner

*Primary Examiner*—Terrel Morris
(74) *Attorney, Agent, or Firm*—Nixon & Vanderhye, P.C.

(57) ABSTRACT

Linerless labels which have a non-quadrate configuration are formed by printing indicia on a first face of a web of label stock and coating the first face with a pressure sensitive adhesive release material, and coating a second face of the web with a pressure sensitive adhesive. A plurality of non-quadrate configuration labels are die-cut from the web, and the labels are taken up in an assembly form in which the labels are readily releasably connected to each other. The labels may be substantially circular in configuration, and connected together in a shingled configuration, a portion of the adhesive of one label overlapping a portion of the top surface of another label. Alternatively, the labels may be connected together with a matrix material having a plurality of paper ties connecting each label to the matrix material or another label.

17 Claims, 2 Drawing Sheets

DIE-CUT LINERLESS LABEL PRODUCTION

BACKGROUND AND SUMMARY OF THE INVENTION

Linerless label products, such as shown in co-pending U.S. application Ser. No. 07/912,851 filed Jul. 13, 1992, Ser. No. 07/914,116 filed Jul. 15, 1992, Ser. No. 07/974,072 filed Nov. 10, 1992, and Ser. No. 07/997,171 filed Dec. 28, 1992, are typically available only in square or rectangular (quadrate) form, or must be die-cut in line on applicating equipment. For example, in situations where the labels are die-cut by the applicating unit just prior to application to cartons or containers they are then mechanically applied to the cartons or containers, however the speed of application is limited by the necessity of die-cutting the labels just before application.

According to the present invention an assembly of a plurality of linerless labels is provided wherein each of the labels has a non-quadrate configuration. The labels may be die-cut in a preliminary stage long before a carton application or other use stage, and readily applied at the use station by easily mechanically removing the labels from contact with each other.

According to one aspect of the present invention an assembly is provided comprising the following elements: A plurality of linerless labels each having a top surface with indicia imaged thereon and a coating of pressure sensitive adhesive release material, and a bottom surface covered with pressure sensitive adhesive, each of the labels of non-quadrate configuration. And, means for readily releasably connecting the plurality of labels to each other.

Typically, each of the labels is substantially circular in configuration, although a wide variety of other non-quadrate geometries could be provided. The means for readily releasably connecting the plurality of labels to each other may comprise a portion of the adhesive of one label overlapping a portion of the top surface of another label, so that the plurality of labels is provided in a shingled configuration. Alternatively, the means for readily releasably connecting the plurality of labels to each other may comprise a matrix material and a plurality of paper ties connecting each label to the matrix material (e.g. four substantially evenly spaced ties).

A number of modifications, such as shown in the applications referenced above, may also be provided. For example the adhesive may be repositional adhesive, although permanent and removable adhesives also may be utilized. Also, a tie coat may be provided between the adhesive and the bottom surface, such as shown in co-pending application Ser. No. 07/912,851 (the disclosure of which is hereby incorporated by reference herein). Also, a thermal coating may be provided on the top surface of the label for imaging indicia in response to the application of heat, such as shown in application Ser. No. 07/914,116 (the disclosure of which is hereby incorporated by reference herein).

According to another aspect of the present invention, an assembly of linerless labels is provided comprising the following elements: A plurality of substantially circular in configuration linerless labels, each having a top surface with adhesive release material and a bottom surface with pressure sensitive adhesive. And, the labels disposed in shingled relationship in a substantially straight line, a portion of the adhesive of one label overlapping a portion of the adhesive release material of an adjacent label.

According to yet another aspect of the present invention an assembly is provided comprising: A plurality of linerless labels each having a top surface with indicia imaged thereon and a coating of pressure sensitive adhesive release material, and a bottom surface covered with pressure sensitive adhesive. And means for readily releasably connecting the plurality of labels to each other, comprising a matrix material and a plurality of paper ties connecting each label to the matrix material or another label.

According to a still further aspect of the present invention a method of making an assembly of linerless labels is provided comprising the steps of: (a) Forming a linerless label web by printing indicia on a first face of a web of label stock and coating the first face with a pressure sensitive adhesive release material, and coating a second face of the web of label stock with a pressure sensitive adhesive. (b) Die-cutting a plurality of non-quadrate configuration labels from the web. And, (c) taking up the plurality of non-quadrate configuration labels in an assembly form in which the plurality of labels are readily releasably connected to each other.

Step (b) is typically practiced to produce labels that are substantially circular in configuration, although other shapes may also be produced. There is also preferably the further step (d), between steps (b) and (c), of separating the die-cut labels from each other and the web; and wherein step (c) is practiced by shingling the labels so that a portion of the pressure sensitive adhesive on one label engages a portion of the release material on an adjacent label. Step (c) is further practiced by taking the shingled labels up in a roll form.

Alternatively, step (b) is practiced to provide a plurality of label stock ties connecting each label to surrounding matrix material of the web; and wherein step (c) is practice by taking up the matrix material with die-cut webs in roll form.

After the labels are taken up, they are typically transferred to a use location, where they may be mechanically applied, without the necessity of die-cutting at the use location.

It is the primary object of the present invention to provide ready and quick application of linerless labels at a use location, particularly non-quadrate linerless labels. This and other objects of the invention will become clear from an inspection of the detailed description of the invention, and from the appended claims.

DETAILED DESCRIPTION OF THE DRAWINGS

Figure 1:
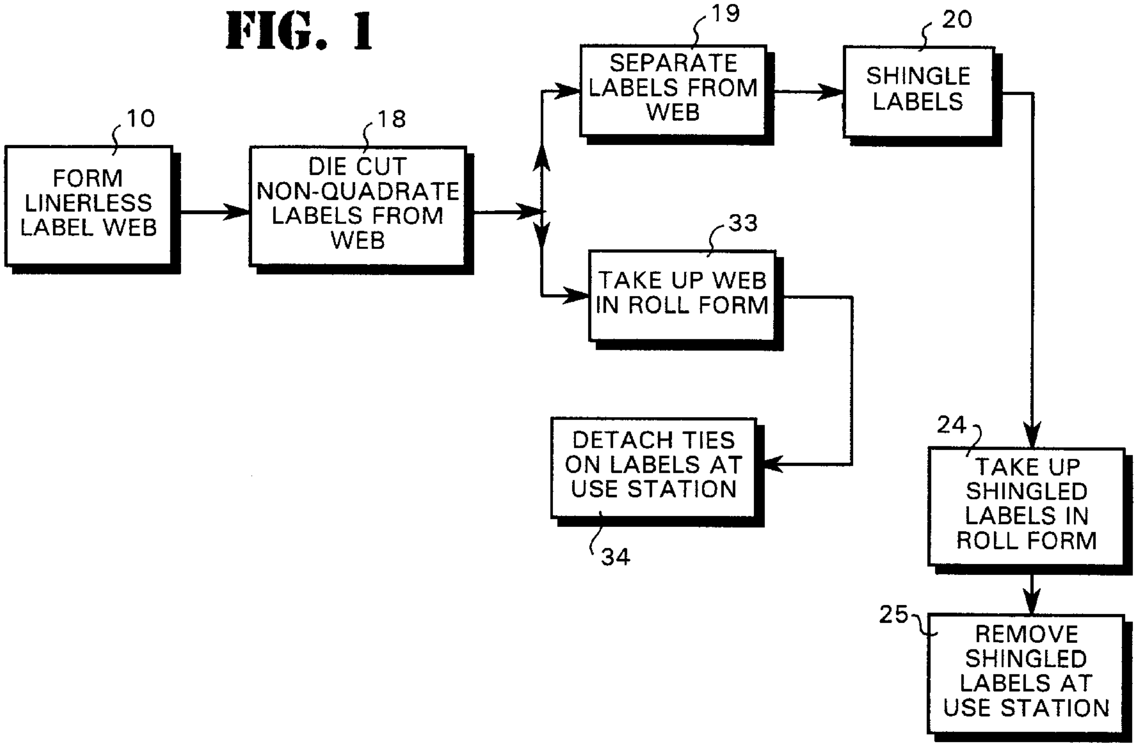
FIG. 1 is a schematic view illustrating exemplary method steps that may be practiced pursuant to the present invention.
Figure 2:
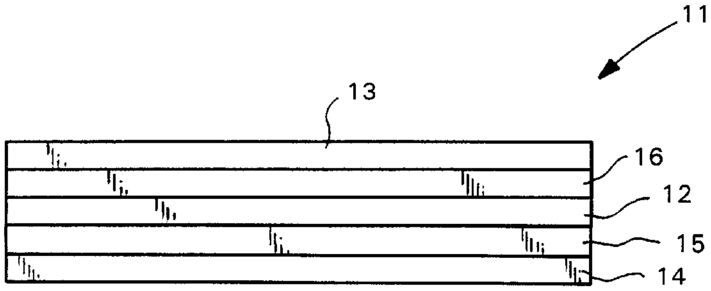
FIG. 2 is a side view of an exemplary linerless label web according to the invention, the components thereof shown greatly exaggerated in thickness for clarity of illustration.

The method according to the present invention, which may have a variety of different details, is illustrated schematically in FIG. 1. As the first step, a linerless label web is produced at stage 10, a side view with the components greatly exaggerated in thickness being shown generally at 11 in FIG. 2. Components of the linerless label web 11 include a label stock layer 12, such as paper or plastic, and a pressure sensitive adhesive release material 13 on one face thereof, and a suitable pressure sensitive adhesive 14 operatively connected to the opposite, second face thereof, as through a tie coat 15. The pressure sensitive adhesive 14 may be repositional, removable, or permanent adhesive, and the tie coat 15—such as shown in co-pending application Ser. No. 07/912,851—may be any suitable material for that purpose. The release coating 13 also may be any suitable release material, typically a silicone based material, with the exact composition of the material varying depending upon the particular adhesive 14 used.

The web 11 is also printed during formation at step 10, utilizing any suitable printing technique applied to the top surface of the label stock 12 before the pressure sensitive release coating 13 is applied. For example ion deposition, laser jet, or like printing can be utilized. If thermal printing is desired, a thermal sensitive layer 16 is provided immediately on the first surface of the label stock 12, such as shown in application Ser. No. 07/914,116. Thermal printing of indicia being practiced prior to the application of the release coating 13 on top of the thermal layer 16.

After stage 10 the labels are die-cut from the web as indicated at stage 18 in FIG. 1. Typically non-quadrate (e.g. circular configuration, other polygon configurations besides quadrate, or irregular configurations) are die-cut from the web 11. Then two alternative procedures may be followed, as indicated schematically in FIG. 1 after the station 18.

Figure 3:
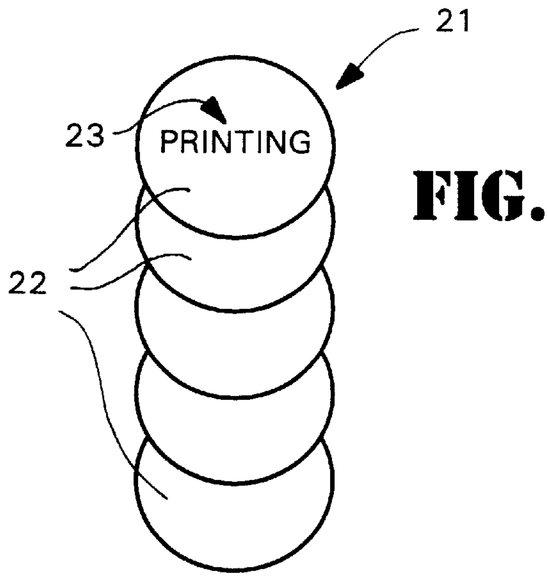
FIG. 3 is a top plan view of a shingled configuration of non-quadrate labels according to the present invention.

According to one procedure, the labels may be separated from the web 11 as indicated at stage 19, and then the labels shingled as indicated at stage 20. An assembly 21 of shingled labels is illustrated in FIG. 3, each of the individual labels 22 being shown as circular in configuration. The printing 23 which has been applied to the top surface of each of the labels 22, beneath the release coat 13, is also visible in FIG. 3. Shingling is accomplished—as illustrated in FIG. 3—by providing a portion of the adhesive 14 of one label 22 overlapping a portion of the top surface with release material 13 thereon of another, for example each label 22 overlapping between about 20 and 80% of an adjacent label. The shingled labels 22 are preferably taken up in an assembly form, such as a conventional roll form, and are transported in that roll form to a use location. At the use location, illustrated schematically at 25 in FIG. 1, the individual shingled labels are removed either manually or mechanically, and applied to cartons, containers, or other objects or sheets.

Figure 4:
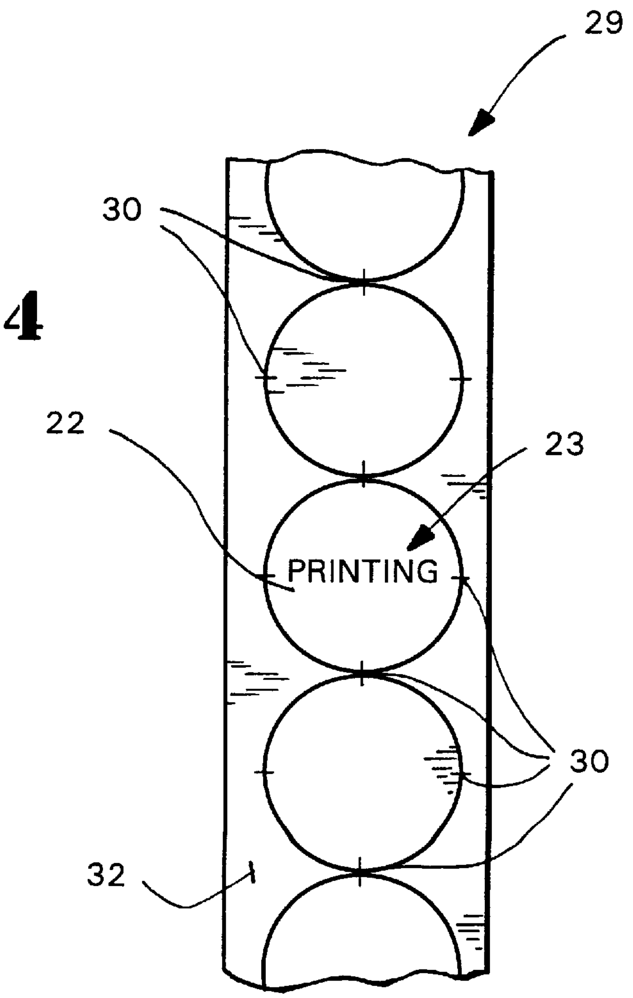
FIG. 4 is a top plan view of a plurality of linerless labels according to the present invention connected together by matrix material.

An alternative procedure that may be followed to the steps 19, 20, 24 and 25, providing an alternative means for readily releasably holding the die-cut labels 22 together, is shown in FIG. 4. FIG. 4, at reference numeral 29, shows the web 11 after the individual labels 22, with the printing 23 thereon, have been die-cut, a plurality of paper ties 30 holding the labels 22 to matrix materials 32. The paper ties (comprising non-die-cut portions of the paper stock 12) may comprise, for example—as shown in FIG. 4—four paper ties 30 connecting each label 22 to an in-line adjacent label 22, or the matrix material 32.

As indicated by stage 33 in FIG. 1, the die-cut web 29 may be taken up in roll form, using conventional take up equipment, and then transported to a use station as indicated schematically at 34. At the use station, application equipment will remove the labels from the web, rewind the waste matrix 32, and affix the labels 22 to cartons, containers, products, or other objects.

It will thus be seen that according to the present invention an advantageous assembly of a plurality of linerless labels, and a method of making an assembly of linerless labels which may be thereafter readily applied to containers, products, or the like without requiring die-cutting at the application site, are provided. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent assemblies and methods.

What is claimed is:

1. A method of making an assembly of linerless labels, comprising the steps of:

(a) forming a linerless label web by printing indicia on a first face of a web of label stock and coating the first face with a pressure sensitive adhesive release material, and coating a second face of the web of label stock with a pressure sensitive adhesive;

(b) die-cutting a plurality of non-quadrate configuration labels from said web;

(c) taking up the plurality of non-quadrate configuration labels in an assembly form in which the plurality of labels are readily releasably connected to each others wherein step (b) is practiced to provide a plurality of label stock ties connecting each label to surrounding matrix material of the web or another label; and wherein step (c) is practiced by taking up the matrix material with die-cut webs in linerless roll form.

2. A method as recited in claim 1 comprising the further step (d), between steps (b) and (c), of separating the die-cut labels from each other and the web; and wherein step (c) is practiced by shingling the labels so that a portion of the pressure sensitive adhesive on one label engages a portion of the release material on an adjacent label the shingled labels completely linerless.

3. A method as recited in claim 2 wherein step (c) is further practiced by taking the shingled labels up in a roll form.

4. A method as recited in claim 2 wherein step (b) is practiced to produce labels that are substantially circular in configuration.

5. A method as recited in claim 1 wherein step (b) is practiced to produce labels that are substantially circular in configuration.

6. A method as recited in claim 2 comprising the further step of transporting the taken-up assembly of labels from step (c) to a use location, and mechanically applying the labels at the use location without the necessity of die-cutting them at the use location.

7. A method as recited in claim 3 wherein step (b) is practiced to produce labels that are substantially circular in configuration.

8. A method as recited in claim 1 comprising the further step of transporting the taken-up assembly of labels from step (c) to a use location, and mechanically applying the labels at the use location without the necessity of die-cutting them at the use location.

9. A method as recited in claim 1 wherein steps (a) and (b) are practiced so as to provide labels with exposed adhesive over the entire second faces thereof.

10. A method as recited in claim 9 wherein step (b) is practiced to produce labels that are substantially circular in configuration.

11. A method as recited in claim 10 comprising the further step (d), between steps (b) and (c), of separating the die-cut labels from each other and the web; and wherein step (c) is practiced by shingling the labels so that a portion of the pressure sensitive adhesive on one label engages a portion of the release material on an adjacent label, the shingled labels completely linerless.

12. A method as recited in claim 9 comprising the further step (d), between steps (b) and (c), of separating the die-cut labels from each other and the web; and wherein step (c) is practiced by shingling the labels so that a portion of the pressure sensitive adhesive on one label engages a portion of the release material on an adjacent label, the shingled labels completely linerless.

13. A method as recited in claim 12 wherein step (c) is further practiced by taking the shingled labels up in a roll form.

14. A method as recited in claim 9 comprising the further step of transporting the taken-up assembly of labels from step (c) to a use location, and mechanically applying the labels at the use location without the necessity of die-cutting them at the use location.

15. A method as recited in claim 12 comprising the further step of transporting the taken-up assembly of labels from step (c) to a use location, and mechanically applying the labels at the use location without the necessity of die-cutting them at the use location.

16. A method of making an assembly of linerless labels, comprising the steps of:

(a) forming a linerless label web by printing indicia on a first face of a web of label stock and coating the first face with a pressure sensitive adhesive release material, and coating a second face of the web of label stock with a pressure sensitive adhesive;

(b) die-cutting a plurality of non-quadrate configuration labels from said web;

(c) taking up the plurality of non-quadrate configuration labels in an assembly form in which the plurality of labels are readily releasably connected to each other;

wherein steps (a) and (b) are practiced so as to provide labels with exposed adhesive over the entire second faces thereof;

wherein step (b) is practiced to provide a plurality of label stock ties connecting each label to surrounding matrix material of the web or another label; and wherein step (c) is practiced by taking up the matrix material with die-cut webs in roll form.

17. A method as recited in claim 16 wherein step (b) is practiced to produce labels that are substantially circular in configuration.

* * * * *